Oct. 7, 1969    E. L. MOLNAR    3,470,933
ROTATIONAL MOLDING OF TIRES AND WHEELS
Filed Sept. 19, 1966    4 Sheets-Sheet 1
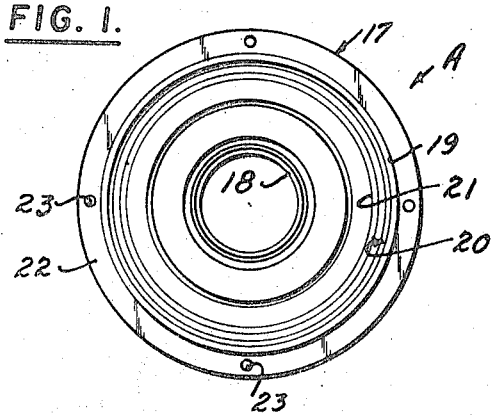
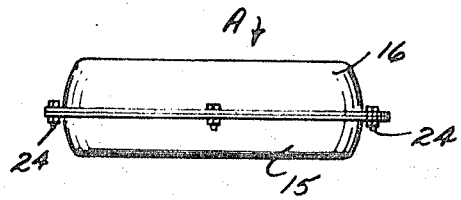
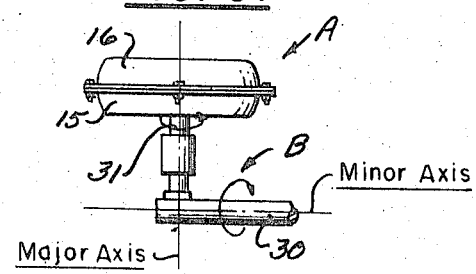
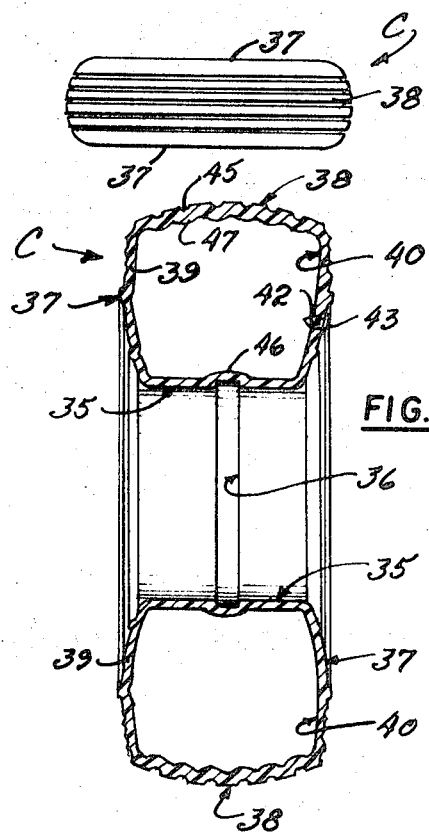
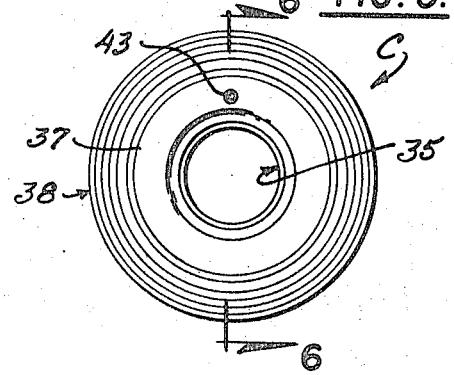
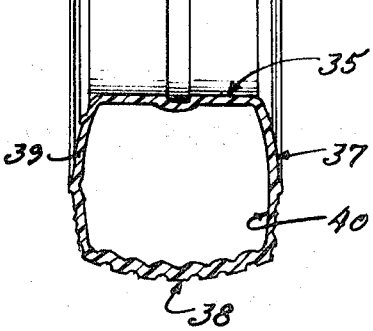
INVENTOR
Ernest L. Molnar
BY *Rommel, Alexine & Rommel*
ATTORNEYS

INVENTOR

Ernest L. Molnar

ATTORNEYS

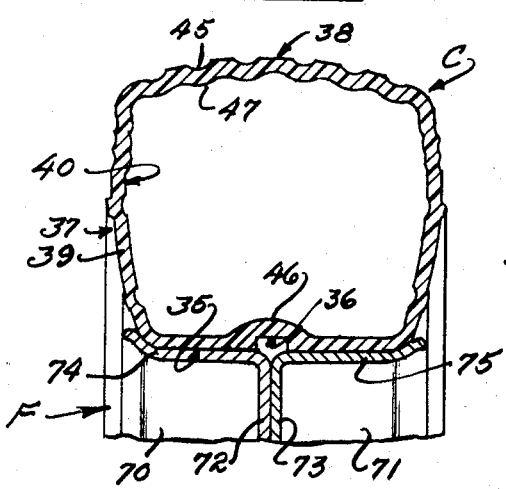
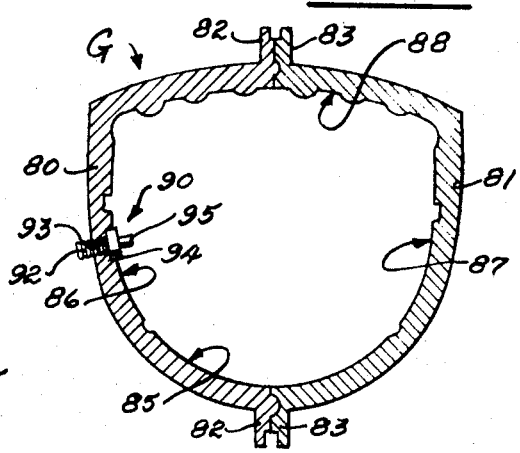
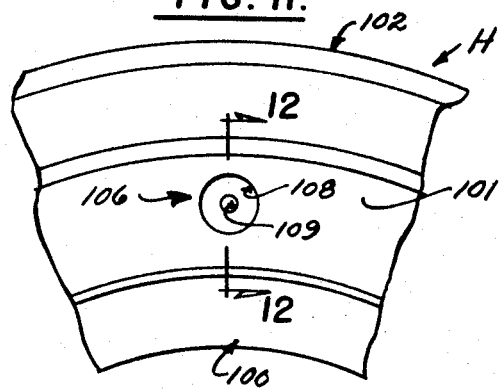
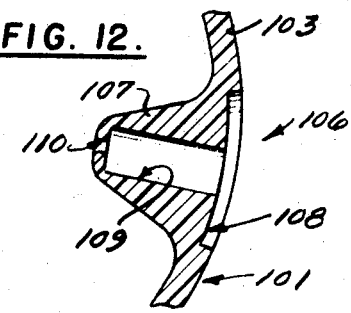
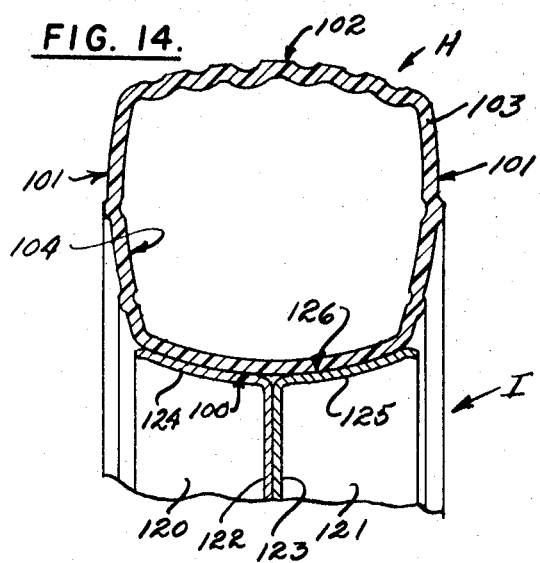
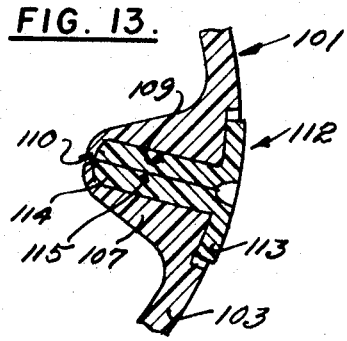

Oct. 7, 1969          E. L. MOLNAR          3,470,933
ROTATIONAL MOLDING OF TIRES AND WHEELS
Filed Sept. 19, 1966          4 Sheets-Sheet 4
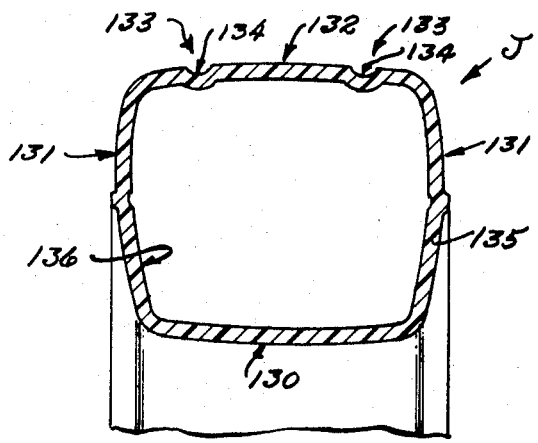
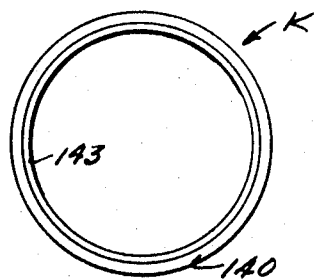
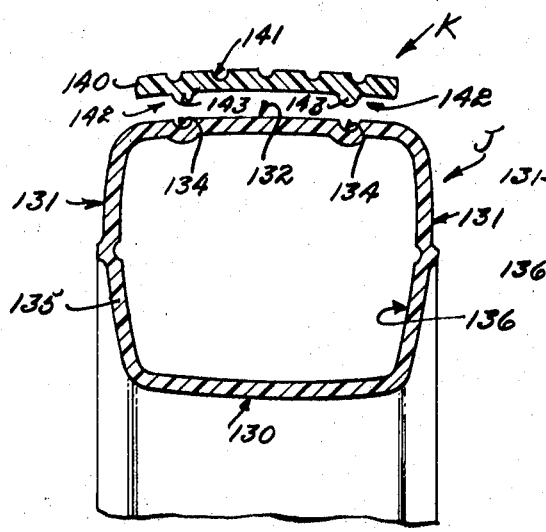
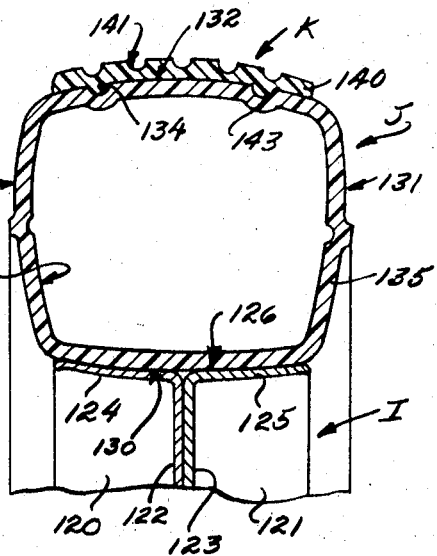
INVENTOR
Ernest L. Molnar
BY *Rommel, Allwein & Rommel*
ATTORNEYS

United States Patent Office 3,470,933
Patented Oct. 7, 1969

---

3,470,933
ROTATIONAL MOLDING OF TIRES AND WHEELS
Ernest L. Molnar, Timonium, Md., assignor to Schenuit Industries, Inc., a corporation of Maryland
Filed Sept. 19, 1966, Ser. No. 580,533
Int. Cl. B60c 5/00
U.S. Cl. 152—330      18 Claims

ABSTRACT OF THE DISCLOSURE

A continuous chamber, cylindrical, homogeneous member in the nature of a tire or wheel that is formed by the rotational molding of a synthetic resin.

---

This invention relates to improvements in rotational molding of tires and wheels.

In general, the objects of the invention are the provision of a continuous chamber, cylindrical, homogeneous one-piece member rotationally molded to provide substantially uniform wall thickness, comprising a body portion including outer peripheral and inner diameter portions and side portions interconnecting the same, and methods of manufacturing such members.

As the invention relates to tire manufacture, the primary object thereof is the provision of a rotationally molded inflatable tire of elastomeric synthetic resin and having a homogeneous one-piece air-tight construction including a base, side wall and tread portions of substantially uniform wall thickness. I am aware that tires of synthetic resin have previously been provided by blow molding processes. However, such blow molded tires usually have extremely thick wall portions and the blow molding process itself creates weak spots at any indentations on the tire, rendering it virtually impossible to provide a suitable inflatable tire by molding of a synthetic resin.

A further object is the provision of an improved mold for rotational molding of inflatable tires having a preformed valve receiving passageway.

A further object is the provision of a rotationally molded inflatable tire for mounting on a rim which normally receives a zero pressure tire.

A further object is the provision of an improved tire having a casing rotationally molded from one of the less expensive synthetic resins and including a pre-formed removable tread portion mounted thereon of a more wear resistant synthetic resin.

Insofar as the invention relates to rotational molding of wheels, the primary object thereof is the provision of a rotationally molded, hollow chamber, zero pressure wheel of a synthetic resin having a homogeneous one-piece construction including a base, side and tread portions of substantially uniform wall thickness. Wheels of synthetic resin have likewise been previously provided by blow molding processes, but here again, such wheels have had extremely thin wall portions at indentations such as the tread portion thereof or axle mounting portions thereof, and have thus proven unacceptable.

Other objects and advantages of the invention will be apparent from the following detailed description, taken in connection with the accompanying drawings, and in which drawings:

FIG. 1 is a top plan view of an open mold section such as may be used in the rotational molding of tires.

FIG. 2 is a side view of a closed mold such as may be used in the rotational molding of tires.

FIG. 3 is a diagrammatic view showing the mold of FIG. 2 mounted on rotational molding equipment.

FIG. 4 is a top view of a tire molded in accordance with the invention.

FIG. 5 is a side view of the tire of FIG. 4.

FIG. 6 is an enlarged vertical sectional view taken substantially on the line 6—6 of FIG. 5.

FIGS. 7, 8 and 9 are enlarged sectional views similar to FIG. 6 and showing my improved tire mounted on various types of rims.

FIG. 10 is a vertical sectional view of an improved mold for rotational molding of an inflatable tire having a preformed valve receiving passageway and is of the type for a tire designed to interfit on a rim which normally receives a zero-pressure tire.

FIG. 11 is a fragmentary side view of a tire formed in the mold of FIG. 10.

FIG. 12 is an enlarged sectional view taken substantially on the line 12—12 of FIG. 11.

FIG. 13 is a view similar to FIG. 12 and showing a valve insert mounted in the valve receiving passageway thereof.

FIG. 14 is a vertical sectional view of the tire of FIG. 11 mounted on a rim which normally receives a zero pressure tire.

FIG. 15 is a vertical sectional view of a rotationally molded inflatable tire casing which may removably receive a tread band.

FIG. 16 is a side view of a tread band which may be peripherally mounted about the casing of FIG. 15.

FIG. 17 is a vertical sectional view showing interfitting of the tread band of FIG. 16 over the deflated tire casing of FIG. 15.

FIG. 18 is a vertical sectional view similar to FIG. 17 with the tire casing thereof inflated.

Figure 7:
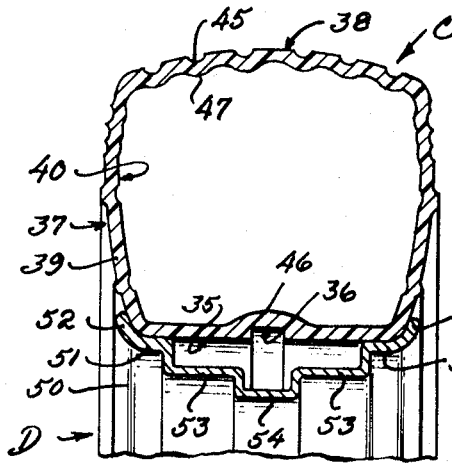
Figure 8:
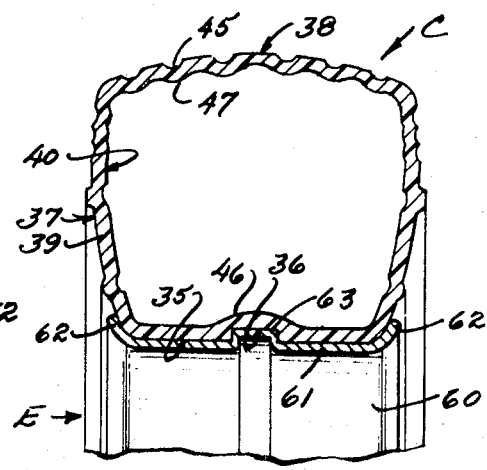
Figure 19:
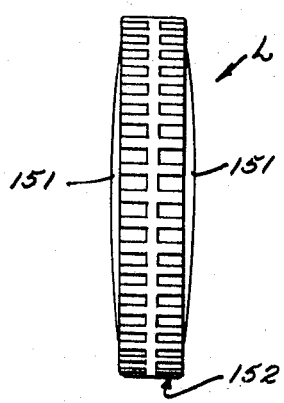
FIG. 19 is a top plan view of a wheel molded in accordance with the invention.
Figure 21:
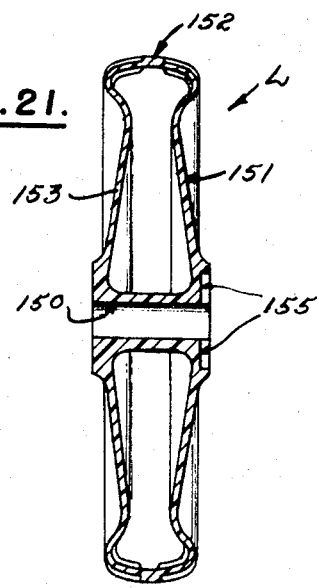
FIG. 21 is an enlarged vertical sectional view taken substantially on the line 21—21 of FIG. 20.
Figure 20:
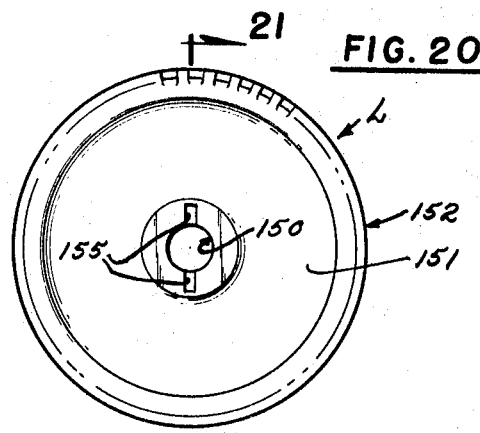
FIG. 20 is a side view of the wheel of FIG. 19.

In the drawings, wherein for the purposes of illustration are shown cylindrical members molded in accordance with the invention, and wherein similar reference characters designate corresponding parts throughout the several views, the letter A may generally designate the mold as shown in FIGS. 1 and 2; B rotational molding equipment as diagrammatically shown in FIG. 3; C a rotationally molded tire as shown in FIGS. 4–9; D the rim construction as shown in FIG. 7; E the rim construction as shown in FIG. 8; F the rim construction as shown in FIG. 9; G the mold as shown in FIG. 10; H a rotationally molded tire as shown in FIGS. 11, 12 and 13; I the rim construction as shown in FIG. 14; J the tire casing as shown in FIG. 15; K the tread band as shown in FIG. 16; and L the wheel construction as shown in FIGS. 19–21.

In the rotational molding process according to my invention, I preferably utilize a split cavity mold to produce hollow, one-piece parts. The mold is usually first treated with a mold release agent and then one-half of the completely dry, unheated mold is charged with a predetermined amount of material, and then joined tightly to the other half. The mold is preferably clamped to a holding fixture, or spider, and mounted on rotational molding equipment. The rotational molding equipment simultaneously rotates the mold about a major and minor axis and the mold is heat treated while it is being rotated. The mold is then cooled and the part is removed from the mold. It is obvious that molding cycle time, rotational speed and oven temperature will be dependent upon the material used, the desired size and wall thickness of the finished product, mold material and mold wall thickness. Hot air is the most commonly used heating medium, although a hot molten salt spray has been found to give satisfactory results. It is preferable to cool the mold while it is being rotated, to prevent the part being molded therein from sagging. Such cooling can be accomplished by water spray, forced air, or immersion in a water bath. The mold may be vented while cooling to prevent excessive internal pressure build-up such as may cause collapsing or uneven shrinkage of the molded part.

I have used a number of different synthetic resins in the rotational molding of tires and wheels, some of which resins have been liquid and others a dry powder. Although not herein specifically enumerated, it is obvious that various additives, such an anti-oxidants, ultra-violet stabilizers and dyes may be intermixed with the various synthetic resins according to the type of resin used and the type and color of finished product desired.

As shown in the drawings, the tire mold A preferably comprises a lower section 15 and an upper section 16. Each section may be of the general configuration as shown in FIG. 1, having a body portion 17 including a tire base forming core or flange portion 18 and an outer wall 19, defining therebetween a chamber portion 20 which may have a plurality of protrusions and indentations 21 concentrically therewithin for forming the desired tread and side wall design of the tire. Outer wall 19 is preferably provided with a peripheral flange 22 having threaded apertures 23 which may be used in interconnection and separation of the mold sections, such as by bolts 24 as shown in FIG. 2, or a conventional quick release assembly (not shown) for holding mold halves together.

Rotational molding equipment B may be of any conventional type, for instance, such as that of Patent No. 2,681,472, dated June 22, 1954. Rotational molding equipment comprises apparatus for moving the mold through various stages of heating and cooling and may be conventional apparatus of this type including a rotatable shaft 30 upon which is rotatably mounted a second shaft 31. Shaft 30 is preferably horizontally disposed, forming a minor axis of rotation for the rotational molding equipment, and shaft 31 is preferably vertically disposed, forming a major axis for the rotational molding equipment. As shown in FIG. 3, mold A is preferably mounted on shaft 31, and is simultaneously rotated about the major and minor axes of the equipment. As previously set forth, rotational speed of the mold about the major and minor axes will be mainly dependent on the type of material used and is one of the primary governing factors in securing a uniform wall thickness. I have found that rotational molding equipment having rotational speeds of from 3–25 r.p.m., with substantially a 4–1 speed ratio between the major and minor axes are acceptable for use in rotational molding of tires.

Tire C is an inflatable tire of homogeneous one-piece air-tight construction formed by rotational molding of an elastomeric synthetic resin according to my invention. Tire C preferably includes a base 35 having a central groove 36; side walls 37; and a tread portion 38. Base 35 forms the inner diameter of tire C and receives the rim which supports the tire, such as rims D and E of FIGS. 7 and 8. Tread 38 comprises the outer peripheral portion of the tire. It is to be specifically noted that the entire wall 39 of tire C is of substantially uniform thickness and forms a continuous air receiving chamber 40 for inflation of the tire. Wall 39 is preferably of sufficient thickness to provide a restrictive shape whereby the tire will retain its general shape whether inflated or deflated and may be inflated to a uniform shape. An opening 42 may be molded in a side wall 37 (in a manner as shown and described in connection with mold G), or drilled in the finished product, which opening 42 receives a valve 43 for inflation of the tire. The valve may, for instance, be of the type as shown in Patent 2,967,558, dated Jan. 10, 1961. Note that wherever wall 39 is provided with an indentation, such as groove 36 or treads 45, that wall 39 extends inwardly slightly to within chamber 40 opposite such indentation, as at 46 and 47. Thus, wall thickness at indentations such as 45 and 46 will be substantially the same as the thickness of the wall at all other parts thereof. This is a vital feature of my invention and one which has heretofore been unobtainable in molding tires and wheels of synthetic resin.

FIG. 7 shows mounting of my improved rotationally molded tire C upon a drop center rim D. This type of rim usually includes a rim body 50 having outer rim portions 51, each provided with a peripheral flange 52, which abut against base 35 and side walls 37 of tire C in support of tire C on the rim. The internal diameter of the tire is usually less than the outer diameter of rim D and, since the tire of synthetic resin which is elastomeric, tire C may be stretched to interfit over an outer flange 52, and firmly seated on rim portions 51. Base 35 is sufficiently rigid to bridge drop centered portions 53 and 54 of rim D.

Rim E is a plate center rim including a body portion 60 having an outer peripheral plate 61 provided with side flanges 62 and a centrally disposed raised flange portion 63. As previously disclosed in connection with mounting of tire C on rim D, tire C has an internal diameter which is usually less than that of the rim over which it is snapped and is sufficiently elastomeric to permit the same to be stretched for interfitting over a side flange 62 and to securely seat on plate 61. Groove 36 of tire C is preferably narrower than flange 63 of rim E and groove 36 is stretched to interfit over and receive flange 63, as shown in FIG. 8.

FIG. 9 shows mounting of my improved rotationally molded tire C upon a flat base rim F. This type of rim usually includes a pair of rim sections 70 and 71 having respective center flanges 72 and 73 and flat rim portions 74 and 75. Center flanges 72 and 73 are bolted or otherwise attached to provide an integral rim, as shown in FIG. 9. Tire C may be mounted on rim F, as shown, base 35 thereof firmly seating on flat rim portions 74 and 75.

Examples of methods of manufacture of tires which may be produced according to the teachings of my invention are as follows:

EXAMPLE 1

After application of suitable mold release agant, one section of mold A was charged with 600 grams of ethylene vinyl acetate having a density of .940 gm./cc., melt index of 8 gm./10 min., a tensile strength of 2000 p.s.i., a durometer hardness (Shore "A") of 90, 35 mesh particle size and containing 20% vinyl acetate. The mold was rotated for 14 minutes at a major axis rotational speed of 6 r.p.m. and a minor axis rotational speed of 1.5 r.p.m., in an oven at a temperature of 575° F. The mold was then cooled by water quenching to room temperature and the tire removed.

Insofar as a general range of ethylene vinyl acetate is concerned, I have found the following properties to be acceptable:

Percent vinyl acetate, percent by weight _____ 5–60
Density, gm./cc. _____ .910–.965
Melt index, gm./10 min. _____ 1–30
Particle size, mesh _____ 10–100
Tensile strength, p.s.i. _____ 500–5000
Durometer hardness (Shore "A") _____ 60–98

EXAMPLE 2

After application of a suitable mold release agent, one section of mold A was charged with 600 grams of polyurethane (E. I. du Pont de Nemours & Co., Inc., "Adiprene" L–100, a urethane rubber which is the reaction product of diisocyanate and a polyalkalene ether glycol), plus 72 grams moca, which polyurethane had an available isocyanate content of 4.1%, tensile strength of 4500 p.s.i., durometer hardness (Shore "A") of 90, 100% modulus (ASTM D412) of 1100 p.s.i., and elongation (ASTM D412) of 500%. The mold was rotated for 20 minutes at a major axis rotational speed of 3.5 r.p.m. and a minor axis rotational speed of .875 r.p.m. in an oven having a temperature of 212° F. The mold was then cooled by water quenching and the tire removed.

Insofar as a general range of polyurethanes is concerned, I have found the following properties to be acceptable:

| | |
|---|---|
| Available isocyanate content, percent by weight | 1.5–9 |
| Tensile strength, p.s.i. | 2000–8000 |
| Durometer hardness (Shore "A") p.s.i. | 50–100 |
| 100% modulus (ASTM D412), p.s.i. | 500–3000 |
| Elongation (ASTM D412), percent | 100–900 |

Additional synthetic resins which have been found to have suitable characteristics for use in rotational molding of tires are as follows.

Dry bland polyvinyl chloride and polyvinyl chloride plastisol having the following general characteristics:

| | |
|---|---|
| Plasticizer ratio, parts per hundred resin (optimum 60) | 20–90 |
| Tensile strength, p.s.i. (optimum 3000 p.s.i.) | 600–4500 |
| Durometer hardness (Shore "A") (optimum 90) | 40–100 |

Mold G, as shown in FIG. 10, comprises a tire mold suitable for rotational molding and which is similar to mold A. Mold G is provided for the rotational molding of an inflatable tire having a rim portion which interfits on a rim normally receiving a zero-pressure tire, whereas mold A provides an inflatable tire which is received on a rim provided for inflatable tires. FIG. 10 comprises a transverse sectional view through mold G, the overall external configuration thereof being similar to mold A.

Mold G preferably includes section halves 80 and 81 having respective mated end and flange portions 82 and 83. Mold sections 80 and 81 may be interconnected together as previously described in connection with mold A, defining therebetween a cylindrical chamber having a tire base forming portion 85, side well forming portions 86 and 87, and tread forming portions 88.

One side wall portion, side wall portion 86 in the form shown, may be provided with pin means 90. Pin means 90 preferably includes a threaded base portion 92 which interfits within threaded opening 93 of side wall portion 86, a ring portion 94 extending above the innermost surface of side wall forming portion 85 and having a pin member 95 projecting inwardly therefrom. In the centrifugal molding of an inflatable tire with a mold having pin means 90, the inflatable tire molded thereby will be provided with a valve receiving means as shown by rotational molded tire H and as will be subsequently described.

It is, of course, to be understood that mold A could likewise be provided with pin means 90 and the same is not limited to use in connection with mold G.

Tire H is a rotationally molded tire such as may be formed by mold G. Tire H may be molded in mold G according to the same methods of manufacture as have been previously desscribed in connection with the rotational molding inflatable tire C.

Tire H preferably includes a semi-circular base 100; side walls 101 and a tread portion 102. Base 100 forms the inner diameter of tire H and is formed to be received on a rim which normally receives a zero-pressure tire, such as rim I of FIG. 14. Tread 102 comprises the outer peripheral portion of the tire. It is to be specifically noted that the entire wall 103 of tire H is ob substantially uniform thickness and forms a continuous air receiving chamber 104 for inflation of the tire. Wall 103 is preferably of sufficient thickness to provide a restrictive shape whereby the tire will retain its general shape whether inflated or deflated and may be inflated to a uniform shape.

In the molding of tire H by mold G, through utilization of pin means 90, one side wall 101 thereof will be provided with valve receiving means 106. Valve receiving means 106 comprises a part of a side wall 101 and includes a substantially conically shaped body portion 107 which is contiguous with wall 103 and extends interiorly of air receiving chamber 104 and provides a recessed portion 108 on the exterior of the tire, a valve receiving passageway 109 leading from recessed portion 108 and substantially through conically shaped portion 107, and terminating in an air passageway 110 of reduced diameter which leads to air receiving chamber 104.

As shown in FIG. 12, valve receiving means 106 may receive a valve 112, which valve 112 may be similar to valve 43 which was previously described. When valve 112 is received by valve receiving means 106, the enlarged head 113 thereof will be received within recessed portion 108 with the main body portion 114 thereof being received within valve receiving passageway 109. Valve stem receiving portions 115 of valve 112 extends from exteriorly of tire H to intercommunication with air passageway 110 of valve receiving means 106.

It is to be specifically noted that, even with the formation of a valve receiving means 106 by such as pin means 90 of mold G, there is no weakening of the side wall and, when valve 112 is intended within valve receiving means 106, that the wall thereof is, in fact, strengthened. This is in contradistinction to tires previously formed by blow molding processes in which the provision of any similar valve receiving means would form a weak spot in the wall of the tire.

FIG. 14 shows mounting of my improved rotational molded tire H upon a rim I which normally receives a thick walled, zero-pressure tire. This type of rim usually includes a pair of rim sections 120 and 121 having respective center flanges 122 and 123; and rim portions 124 and 125 which define a semi-circular cup-like rim cavity 126. Center flanges 122 and 123 are molded or otherwise attached to provide an integral rim, as shown in FIG. 14. Tire H may be mounted on rim I, as shown, semi-circular base 100 thereof being received by semi-circular cup-like cavity 126 thereof.

Insofar as tire casing J and tread band K are concerned, the same represents a concept whereby casing J may be rotationally molded from one of the lens expensive synthetic resins, such as ethylene vinyl acetate or polyvinyl chloride and tread band K may be preformed of one of the more expensive and more wear resistant synthetic resins such as polyurethane. In this manner I am able to provide an inflatable tire which is substantially less expensive than one formed entirely of polyurethane, but which has wear resistant characteristics which are substantially equivalent to those of an integral polyurethane tire.

Tire casing J preferably comprises an inflatable casing of homogeneous one-piece air-tight construction formed by rotational molding of an elastomeric synthetic resin according to the methods for forming an inflatable tire as herein previously set forth. Casing J preferably includes a base 130; side walls 131; and a tread portion 132. Base 130 forms the inner diameter of casing J and receives the rim which supports the tire. Casing J may be rotationally molded to fit any desired type of rim, such as rims D, E, F, and I.

Tread portion 132 comprises the outer peripheral portion of casing J. Instead of the usual tread configuration such as provided on tires C and H tread portion 132 includes means 133 for positioning of tread band K thereabout. Means 133 may comprise a pair of peripheral grooves 134 provided externally about wall 135 of casing J. It is to be specifically noted that the entire wall 135 of casing J is of substantially uniform thickness and forms a continuous air receiving chamber 136 for inflation of the tire. Wall 135 is preferably of sufficient thickness to provide a restrictive shape whereby the tire retains its general shape whether inflated or deflated and may be Suitable valve means (not shown) may be provided for inflation of casing J, in the same manner as previously described in connection with tires C and H.

Tread band K preferably includes a disc-shaped body portion 140 having a tread 141 on one side thereof and means 142 on the other side thereof which cooperate with means 133 of casing J in positioning of tread band K on casing J. Means 142 may comprise a pair of flange portions 143 which extend about the interior diameter of body portion 140 and interfit within peripheral grooves 134 of casing J in positioning of tread band K on casing J.

As shown in FIG. 17 in the mounting of tread band K on casing J, the same is interfitted peripherally about casing J when casing J is deflated and casing J with tread band K thereabout is mounted on such as rim I, as shown in FIG. 18. Upon inflation of casing J, as shown in FIG. 18, tread band K will be securely positioned peripherally thereabout.

Wheel L is a hollow chamber zero pressure wheel of homogeneous one-piece construction formed by the rotational molding of a synthetic resin and includes base portion 150, side portion 151 and tread portion 152. Wall 153 of wheel L is preferably of substantially uniform wall thickness. Base 150 comprises an inner diameter portion of wheel L for support of the same on an axle and tread 152 comprising the outer peripheral portion of the wheel, with sides 151 extending between base 150 and tread portion 152. One side 151, adjacent base 150, may be provided with slotted portions 155. In the mounting of wheel L on an axle, a pin is conventionally provided through the axle and which pin may be received within slots 155 so that wheel L will rotate with the axle upon which the same is mounted. In this connection, as was in the case with tire C, wall 153 is of substantially uniform wall thickness, even adjacent slots 155.

Wheel L may be molded in molds similar to mold A, but having an internal configuration which provides a finished product in the form of wheel L, rather than a tire. Inasmuch as the configuration of this type of mold is believed to be obvious, it was deemed unnecessary to further show the same. The mold (not shown) for wheel L would be mounted in the same manner as mold A on rotational molding equipment such as equipment B of FIG. 3 and the mold rotated about a minor and major axis in the same manner as previously described in connection with the rotational molding of tire C.

Examples of formation of wheel L from various materials are as follows:

EXAMPLE 1

After application of a suitable release agent, to the wheel mold, the mold was charged with 225 grams of a high density polyethylene having a density of .958 gm./cc., a particle size of 35 mesh, melt index of 6 gm./10 min., tensile strength of 4000 p.s.i., and durometer hardness (Shore "D") of 67. The mold was then mounted on the rotational molding equipment and rotated for 12 minutes about the major axis at 6 r.p.m. and about the minor axis at 1.5 r.p.m. in an oven having a temperature of 600° F. The mold was then removed from the oven and cooled by a mist spray to 180° F. and the wheel removed from the mold.

I have found high density polyethylenes having the following characteristics to be suitable for rotational molding of the wheel according to my invention:

Density, gm./cc. _____ .941–.965
Particle size, mesh _____ 10–100
Melt index, gm./10 min. _____ 1–30
Tensile strength, p.s.i. _____ 1000–5000
Durometer hardness (Shore "D") _____ 40–90

EXAMPLE 2

After application of a suitable reelase agent, to the wheel mold, the mold was charged with 338 grams dry blend polyvinyl chloride having a plasticizer ratio of 25 parts per hundred resin, tensile strength of 3600 p.s.i. and durometer hardness (Shore "D") of 65. The mold was then closed and rotated for 13 minutes at a major axis rotational speed of 6 r.p.m. and a minor axis rotational speed of 1.5 r.p.m. in an oven at 540° F. The mold was then cooled by water quenching and the wheel removed.

I have found dry blend polyvinyl chloride and polyvinyl chloride plastisols having the following general characteristics to be suitable for rotational molding of wheels according to my invention:

Plasticizer ratio, parts per hunderd resin ____ 10–80
Tensile strength, p.s.i. _____ 2000–6000
Durometer hardness (Shore "D") _____ 30–80

In accordance with my invention, I have thus provided improved tires and wheels formed by rotational molding of synthetic resins and methods for manufacture of the same.

Various changes in the forms of the invention herein shown and described may be made without departing from the spirit of the invention.

I claim:

1. As an article of manufacture, a continuous chamber inflatable tire having a base, side walls and tread portion of substantially uniform wall thickness, said tire being formed by rotational molding of an elastomeric synthetic resin comprising ethylene vinyl acetate having 5–60% by weight vinyl acetate, a density of .910–.965 gm./cc., a melt index of 1–30 gm./10 min., a particle size of 10–100 mesh a tensile strength of 500–5000 p.s.i., and a durometer hardness (Shore "A") of 60–98.

2. An article of manufacture as specified in claim 1 wherein the ethylene vinyl acetate comprises substantially 20% by weight vinyl acetate, has a density of substantially .940 gm./cc., a melt index of 8 gm./10 min., a particle size of substantially 35 mesh, a tensile strength of substantially 2000 p.s.i., and a durometer hardness (Shore "A") of substantially 90.

3. As an article of manufacture, a continuous chamber inflatable tire having a base, side walls and tread portion of substantially uniform wall thickness, said tire being formed by rotational molding of an elastomeric synthetic resin comprising dry blend polyvinyl chloride having a plasticizer ratio of 20–90 parts per hundred resin, a tensile strength of 600–4500 p.s.i., and duometer hardness (Shore "A") of 40–100.

4. An article of manufacture as specified in claim 3 wherein the dry blend polyvinyl chloride has a plasticizer ratio of substantially 60 parts per hundred resin, a tensile strength of substantially 3000 p.s.i., and a durometer hardness (Shore "A") of substantially 90.

5. As an article of manufacture, a continuous chamber inflatable tire having a base, side walls and tread portion of substantially uniform wall thickness, said tire being formed by rotational molding of an elastomeric synthetic resin comprising polyvinyl chloride plastisol having a plasticizer ratio of 20–90 parts per hundred resin, a tensile strength of 600–4500 p.s.i., and a durometer hardness (Shore "A") of 40–100.

6. An article of manufacture as specified in claim 5 wherein the polyvinyl chloride plastisol has a plasticizer ratio of substantially 60 parts per hundred resin, a tensile strength of substantially 3000 p.s.i., and a durometer hardness (Shore "A") of substantially 90.

7. As an article of manufacture, a continuous chamber inflatable tire having a base, side walls and tread portion of substantially uniform wall thickness, said tire being formed by rotational molding of an elastomeric synthetic resin comprising polyurethane having an available isocyanate content of 1.5–9% by weight, a tensile strength of 2000–8000 p.s.i., a durometer hardness (Shore "A") of 50–100, 100% modulus (ASTM D412) of 500–3000 p.s.i., and elongation (ASTM D412) of 100–900%.

8. An article of manufacture as specified in claim 7 wherein the polyurthane has an available isocyanate content of substantially 4.1% by weight, a tensile strength of substantially 4500 p.s.i., a durometer hardness (Shore "A") of substantially 90, 100% modulus (ASTM D412) of substantially 1100 p.s.i., and elongation (ASTM D412) of substantially 500%.

9. As an article of manufacture, a continuous chamber inflatable tire having a base, side walls and tread portion of substantially uniform wall thickness, said tire being formed by rotational molding of an elastomeric synthetic resin and designed for mounting on a plate center rim having a centrally disposed peripheral flange, said base of said tire including a groove of less width than the width of said flange and being sufficiently flexible for stretching said groove for interfitting of said flange therewithin.

10. As an article of manufacture, a continuous chamber inflatable tire having a base, side walls and tread portion of substantially uniform wall thickness, said tire being formed by rotational molding of an elastomeric synthetic resin and having a valve receiving means molded into a side wall thereof, said valve receiving means comprising a part of said sidewall and including a substantially conically shaped portion extending interiorly of said tire, a recessed portion on the exterior of said tire, and a valve receiving passageway leading from said recessed portion and substantially through said conically shaped portion and terminating in an air passageway of reduced diameter leading to the interior of said tire.

11. As an article of manufacture, a continuous chamber inflatable tire having a base, side walls and tread portion of substantially uniform wall thickness, said tire being formed by rotational molding of an elastomeric synthetic resin, said base, sidewalls and tread portion comprising a casing, a removable tread band mounted on said casing, said casing and said tread band including interacting means for positioning of said tread band on said casing, said casing comprises ethylene vinyl acetate having a 5–60% by weight vinyl acetate, a density of .910–.965 gm./cc., a melt index of 1–30 gm./10 min., a particle size of 10–100 mesh, a tensile strength of 500–5000 p.s.i., and a durometer hardness (Shore "A") of 60–98, and said tread band is polyurethane.

12. As an article of manufacture, a continuous chamber inflatable tire having a base, side walls and tread portion of substantially uniform wall thickness, said tire being formed by rotational molding of an elastomeric synthetic resin, said base, sidewalls and tread portion comprising a casing, a removable tread band mounted on said casing, said casing and said tread band including interacting means for positioning of said tread band on said casing, wherein said casing comprises dry blend polyvinyl chloride having a plasticizer ratio of 20–90 parts per hundred resin, a tensile strength of 600–4500 p.s.i., and a durometer hardness (Shore "A") of 40–100, and said tread band is polyurethane.

13. As an article of manufacture, a hollow chamber zero pressure wheel of homogeneous one-piece construction and having a base, side and tread portions of substantially uniform wall thickness, said wheel being formed by rotational molding of a synthetic resin comprising high density polyethylene having a density of .941–.965 gm./cc., a melt index of 1–30 gm./10 min., a particle size of 10–100 mesh, a tensile strength of 1000–5000 p.s.i., and a durometer hardness (Shore "D") of 40–90.

14. An article of manufacture as specified in claim 13 wherein the high density polyethylene has a density of substantially .958 gm./cc., a melt index of substantially 6 gm./10 min., a particle size of substantially 35 mesh, a tensile strength of substantially 4000 p.s.i., and a durometer hardness (Shore "D") of substantially 35.

15. As an article of manufacture, a hollow chamber zero pressure wheel of homogeneous one-piece construction and having a base, side and tread portions of substantially uniform wall thickness, said wheel being formed by rotational molding of a synthetic resin comprising dry blend polyvinyl chloride having a plasticizer ratio of 10–80 parts per hundred resin, a tensile strength of 2000–6000 p.s.i., and a durometer hardness (Shore "D") of 30–80.

16. An article of manufacture as specified in claim 15 wherein the dry blend polyvinyl chloride has a plasticizer ratio of substantially 25 parts per hundred resin, a tensile strength of substantially 3600 p.s.i., and durometer hardness (Shore "D") of substantially 65.

17. As an article of manufacture, a hollow chamber zero pressure wheel of homogeneous one-piece construction and having a base, side and tread portions of substantially uniform wall thickness, said wheel being formed by rotational molding of a synethetic resin comprising polyvinyl chloride plastisol having a plasticizer ratio of 10–80 parts per hundred resin, a tensile strength of 2000–6000 p.s.i., and a durometer hardness (Shore "D") of 30–80.

18. An article of manufacture as specified in claim 17 wherein the polyvinyl chloride plastisol has a plasticizer ratio of substantially 25 parts per hundred resin, a tensile strength of substantially 3600 p.s.i., and a durometer hardness (Shore "D") of substantially 65.

References Cited

UNITED STATES PATENTS

| | | | |
|---|---|---|---|
| 399,355 | 3/1889 | Thomas | 152—330 |
| 1,571,493 | 2/1926 | Schumacher | 152—176 X |
| 2,940,781 | 6/1960 | Erikson. | |
| 3,208,500 | 9/1965 | Knipp et al. | 152—330 X |

FOREIGN PATENTS 1,033,377  6/1966  Great Britain.

ARTHUR L. LA POINT, Primary Examiner

CHARLES B. LYON, Assistant Examiner

U.S. Cl. X.R.

152—429; 301—63